UNITED STATES PATENT OFFICE.

AUGUST LEOPOLD LASKA, OF OFFENBACH-ON-THE-MAIN, GERMANY, ASSIGNOR TO THE CORPORATION OF CHEMISCHE FABRIK GRIESHEIM-ELEKTRON, OF FRANKFORT-ON-THE-MAIN, GERMANY.

DISAZO DYES FOR WOOL.

995,161.  Specification of Letters Patent.  Patented June 13, 1911.

No Drawing.  Application filed December 13, 1910.  Serial No. 597,063.

*To all whom it may concern:*

Be it known that I, AUGUST LEOPOLD LASKA, doctor of philosophy, chemist, a subject of the German Emperor, and resident of Offenbach - on - the Main, in the Grand Duchy of Hessen, Germany, with the post-office address Gerberstrasse No. 5, have invented new and useful Improvements in Disazo Dyes for Wool, of which the following is a specification.

My invention relates to the manufacture of disazo dyestuffs for wool and consists in combining tetrazotized diaminobases of the general formula:

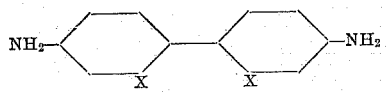

wherein X means $CH_3$ or Cl with one molecular proportion of an ortho-oxy-carboxylic acid of the benzene series and in alkaline solution with one molecular proportion of a 2:amino-8-naphthol compound of the general formula:

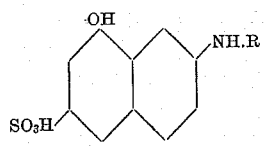

wherein R means H or a substituent, for instance an alkyl—, an aralkyl— or an aryl group. The thus obtained dyestuffs dye wool from acid bath from reddish to yellowish-brown shades, which in the milling process without after treatment with chromates do not stain interwoven white wool and cotton.

Diaminobases of the aforesaid constitution are meta-tolidin and meta-meta$^1$-dichlorobenzidin.

The following examples will serve to illustrate the nature of my invention and how it can be carried out; parts being by weight.

Example I: 10.6 parts of meta-tolidin are tetrazotized in the usual manner. The tetrazo compound is poured into a solution of 7.5 parts of salicylic acid containing the necessary amount of sodium carbonate and cooled with ice. After formation of the intermediate product a solution of 16 parts of 2-phenylamino-8-naphthol-6-sulfonic acid, neutralized by means of sodium carbonate, is added. The mixture is stirred during 12 hours, and the dyestuff finished in the usual manner. It is in dry state a dark-brown powder, soluble in concentrated sulfuric acid with red-brown, in water with brown color. The aqueous solution turns rather reddish by addition of caustic soda lye; by addition of hydrochloric acid the dyestuff is precipitated in shape of red-brown flakes. It dyes wool from acid bath yellowish-brown shades, which do not stain interwoven white wool and cotton in the milling process.

Example II: 12.65 parts of meta-meta$^1$-dichlorobenzidin are dissolved in 500 parts of water and 45 parts of hydrochloric acid 20 Bé., cooled with ice and diazotized with a solution of 7 parts of sodium nitrite. The tetrazo compound is allowed to flow into a solution of 7.5 parts of salicylic acid and 55 parts of sodium carbonate in 500 parts of water cooled with ice. After formation of the intermediate product a solution of 16 parts of 2-phenylamino-8-naphthol-6-sulfonic acid neutralized by means of soda, is added, and the mixture stirred during 12 hours. The dyestuff is finished in the usual manner. It is in dry state a brown-black powder, soluble in concentrated sulfuric acid with red-brown, in water with brown color. The aqueous solution is hardly altered by addition of caustic soda lye; by addition of hydrochloric acid the dyestuff is precipitated in shape of brown flakes. It dyes wool from acid bath yellowish-brown shades of good fastness to milling.

In the same manner may be performed the manufacture of dyestuff if instead of salicylic acid ortho- or meta-cresotinic acid, and instead of 2-phenylamino-8-naphthol-6-sulfonic acid other arylized or alkylized derivatives of the 2-amino-8-naphthol-6-sulfonic acid or the 2-amino-8-naphthol-6-sulfonic acid itself are used.

All the thus obtained dyestuffs show the same essential properties; they dye wool brown shades which in the milling process do not stain interwoven white wool and cotton.

Now what I claim and desire to secure by Letters Patent is the following:

1. The process for manufacturing brown azo dyestuffs for wool, consisting in combining the tetrazo compounds of diaminobases with one molecular proportion of an ortho-oxy-carboxylic acid of the benzene series, and in alkaline solution with one molecular proportion of 2-arylamino-8-naphthol-6-sulfonic acid.

2. The process for the manufacture of brown azo dyestuffs for wool consisting in combining the tetrazo compounds of meta-meta¹-dichlorobenzidin with one molecular proportion of an ortho-oxy-carboxylic acid of the benzene series, and in alkaline solution with one molecular proportion of 2-arylamino-8-naphthol-6-sulfonic acid.

3. As new articles the azo dyestuffs obtained by combining the tetrazo compound of meta-meta¹-dichlorobenzidin with one molecular proportion of an ortho-oxy-carboxylic acid of the benzene series, and in alkaline solution with one molecular proportion of 2-arylamino-8-naphthol-6-sulfonic acid, which dyestuffs are dark brown powders, soluble in concentrated sulfuric acid with red-brown, in water with brown color, the aqueous solution being hardly altered by addition of caustic soda lye, the dyestuffs being precipitated thereof by addition of hydrochloric acid in shape of red-brown flakes dyeing wool brown shades fast to milling, yielding upon reduction with stannous chlorid and hydrochloric acid meta-meta¹-dichlorobenzidin, a p-amino-ortho-oxy-carboxylic acid of the benzene series and 7-amino-2-arylamino-8-naphthol-6-sulfonic acid.

4. The process for manufacturing a brown azo dyestuff for wool, consisting in combining the tetrazo compound of meta-meta¹-dichlorobenzidin with one molecular proportion of salicylic acid, and in alkaline solution with one molecular proportion of 2-phenylamino-8-naphthol-6-sulfonic acid.

5. As a new article the azo dyestuff, obtained by combining the tetra compound of meta-meta¹-dichlorobenzidin with one molecular proportion of salicylic acid, and in alkaline solution with one molecular proportion of 2-phenyl-amino-8-naphthol-6-sulfonic acid, which dyestuff is a dark brown powder, soluble in concentrated sulfuric acid with red-brown, in water with brown color, the aqueous solution turning rather more red by addition of caustic soda lye, the dyestuff being precipitated thereof by addition of hydrochloric acid in shape of red-brown flakes and dyeing wool brown shades fast to milling, yielding upon reduction with stannous chlorid and hydrochloric acid meta-meta¹-dichlorobenzidin, p-amino-salicylic acid and 7-amino-2-phenylamino-8-naphthol-6-sulfonic acid.

In testimony, that I claim the foregoing as my invention, I have signed my name in presence of two witnesses, this second day of December 1910.

AUGUST LEOPOLD LASKA.

Witnesses:
HERMANN WEIL,
EMMA MARX.